United States Patent
Sung et al.

(10) Patent No.: US 7,706,226 B2
(45) Date of Patent: Apr. 27, 2010

(54) DETERMINATION OF OPTIMUM WRITING STRATEGY FOR RECORDING INFORMATION ONTO OPTICAL INFORMATION RECORDING MEDIUM

(76) Inventors: Yu-Cheng Sung, c/o Beng Corporation, No. 157, Shan-Ying Rd., Kweishan, Taoyuan (TW); Chia-Fong Yang, c/o Beng Corporation, No. 157, Shan-Ying Rd., Kweishan, Taoyuan (TW)

( * ) Notice: Subject to any disclaimer, the term of this patent is extended or adjusted under 35 U.S.C. 154(b) by 1062 days.

(21) Appl. No.: 11/367,103

(22) Filed: Mar. 3, 2006

(65) Prior Publication Data

US 2006/0198250 A1    Sep. 7, 2006

(30) Foreign Application Priority Data

Mar. 4, 2005    (TW) ............................. 94106600 A

(51) Int. Cl.
*G11B 7/00*    (2006.01)
(52) U.S. Cl. ................................. 369/47.51; 369/59.13
(58) Field of Classification Search ............... 369/47.51
See application file for complete search history.

(56) References Cited

U.S. PATENT DOCUMENTS 5,642,343 A * 6/1997 Toda et al. ............... 369/47.53
2002/0159352 A1 * 10/2002 Yamada .................... 369/53.15
2003/0021201 A1 * 1/2003 Kobayashi ............... 369/47.39
2003/0076759 A1 * 4/2003 Yu ............................ 369/53.1
2004/0017751 A1 * 1/2004 Matsumoto ............... 369/47.53
2005/0030859 A1    2/2005 Nishimura et al.
2005/0069300 A1 * 3/2005 Takenaka .................... 386/125
2005/0105434 A1 * 5/2005 Hori et al. ................ 369/53.31
2005/0174912 A1 * 8/2005 Nagamura ............... 369/59.12

FOREIGN PATENT DOCUMENTS

TW    588 334    5/2004

* cited by examiner

*Primary Examiner*—Wayne R Young
*Assistant Examiner*—Adam R Giesy
(74) *Attorney, Agent, or Firm*—Perkins Coie LLP

(57) ABSTRACT

The invention is to provide a method for determining an optimum writing strategy for an optical information recording system to record information onto an optical information recording medium. According to a preferred embodiment of the method of the invention, a determination function of speed and temperature is provided. The determination function is related to a plurality of allowable writing strategies. Then, the optical information recording system receives a user-desired speed and senses a temperature therein. Finally, one of the allowable writing strategies is determined, by applying the user-desired speed and the temperature in the determination function, as the optimum writing strategy.

17 Claims, 3 Drawing Sheets

DETERMINATION OF OPTIMUM WRITING STRATEGY FOR RECORDING INFORMATION ONTO OPTICAL INFORMATION RECORDING MEDIUM

BACKGROUND OF THE INVENTION

1. Field of the Invention

The invention relates to a method for determining an optimum writing strategy for an optical information recording system to record information onto an optical information recording medium, and more particularly, the invention utilizes speed and temperature to determine the optimum writing strategy.

2. Description of the Prior Art

The CD-RW drives are having higher and higher speed nowadays; however, the ultra-speed drive is sensitive to temperature. Therefore, the overheating problem, caused by the ultra-high speed recording, has to be solved effectively to maintain the recording quality. The conventional methods to solve the overheating problem are as follows:

One method is to change the mechanism, so as to improve the cooling efficiency, but this will cost too much time and resources to accomplish.

Another method is to record with lower speed or recording suspension. This is a normal protection for the drive to prevent damage caused by overheating. However, the recording time is increased, and the purpose of having ultra-speed is lost.

However, from the results of experiments, the writing strategy determined in high temperature is different from that found in room temperature, and the writing strategy determined in high temperature can efficiently solve the overheating problem, so that the recording quality can be kept consistent. Accordingly, an objective of the invention is to provide a method for determining an optimum writing strategy which utilizes temperature and speed as conditions to determine the optimum writing strategy; hence, the optimum writing strategy satisfies the purpose of ultra-speed recording and solves the problem mentioned above.

SUMMARY OF THE INVENTION

According to the first embodiment of the present invention, the method is used for determining an optimum writing strategy for an optical information recording system to record information onto an optical information recording medium.

First, a determination function of speed and temperature is provided, and the determination function relates to a plurality of allowable writing strategies. Next, the optical information recording system receives a user-desired speed and senses a temperature therein. Finally, one of the allowable writing strategies is determined, by applying the user-desired speed and the temperature into the determination function, as the optimum writing strategy.

According to the second embodiment of the present invention, the method is used for determining an optimum writing strategy for an optical information recording system to record information onto an optical information recording medium operated at a certain speed.

First, a determination function of temperature is provided, and the determination function relates to a plurality of allowable writing strategies. Next, a temperature in the optical information recording system is sensed. Finally, one of the allowable writing strategies is determined, by applying the temperature into the determination function, as the optimum writing strategy.

The invention utilizes temperature as a condition to determine the optimum writing strategy; hence, the optimum writing strategy is more flexible and suitable for use. Moreover, the optimum writing strategy satisfies with the purpose of ultra-speed recording, and users can use the optimum writing strategy to record information onto an optical information recording medium.

The advantage and spirit of the invention may be understood by the following recitations together with the appended drawings.

BRIEF DESCRIPTION OF THE APPENDED DRAWINGS

DETAILED DESCRIPTION OF THE INVENTION

The objective of the invention is to provide a method for determining an optimum writing strategy; the optimum writing strategy is used for an optical information recording system to record information onto an optical information recording medium. An optimum writing strategy is determined easily and dependably in accordance with the method for determining an optimum writing strategy of the present invention. Especially for the users of ultra-speed recording, the invention can solve the overheating problem caused by the ultra-speed recording and can raise the recording quality.

Figure 1:
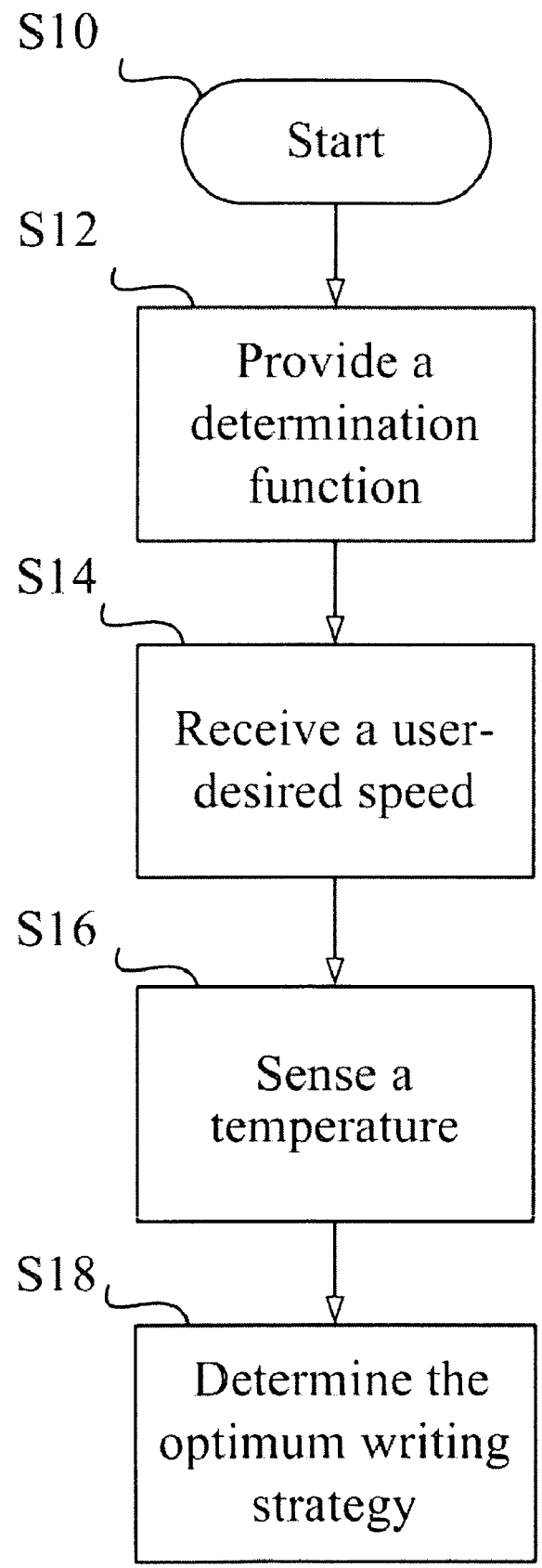
FIG. 1 is a flowchart illustrating the method for determining an optimum writing strategy according to a first preferred embodiment of the invention.

Referring to FIG. 1, FIG. 1 is a flowchart illustrating the method for determining an optimum writing strategy according to a first preferred embodiment of the present invention. In the first preferred embodiment, the optical information recording system is a CD drive.

As shown in FIG. 1, the procedure of the method for determining an optimum writing strategy according to the first preferred embodiment of the invention includes the following steps. First, step S10 is performed to set the initial conditions. Next, step S12 is performed in which a determination function of speed and temperature is provided; the determination function relates to a plurality of allowable writing strategies, and it can be provided by a server nearby or a remote server. Step S14 and step S16 are then performed. In step S14, the CD drive receives a user-desired speed, and a temperature in the CD drive is sensed in step S16. Step S18 is then performed. In step S18, one of the allowable writing strategies is determined, by applying the user-desired speed and the temperature into the determination function, as the optimum writing strategy.

Figure 2:
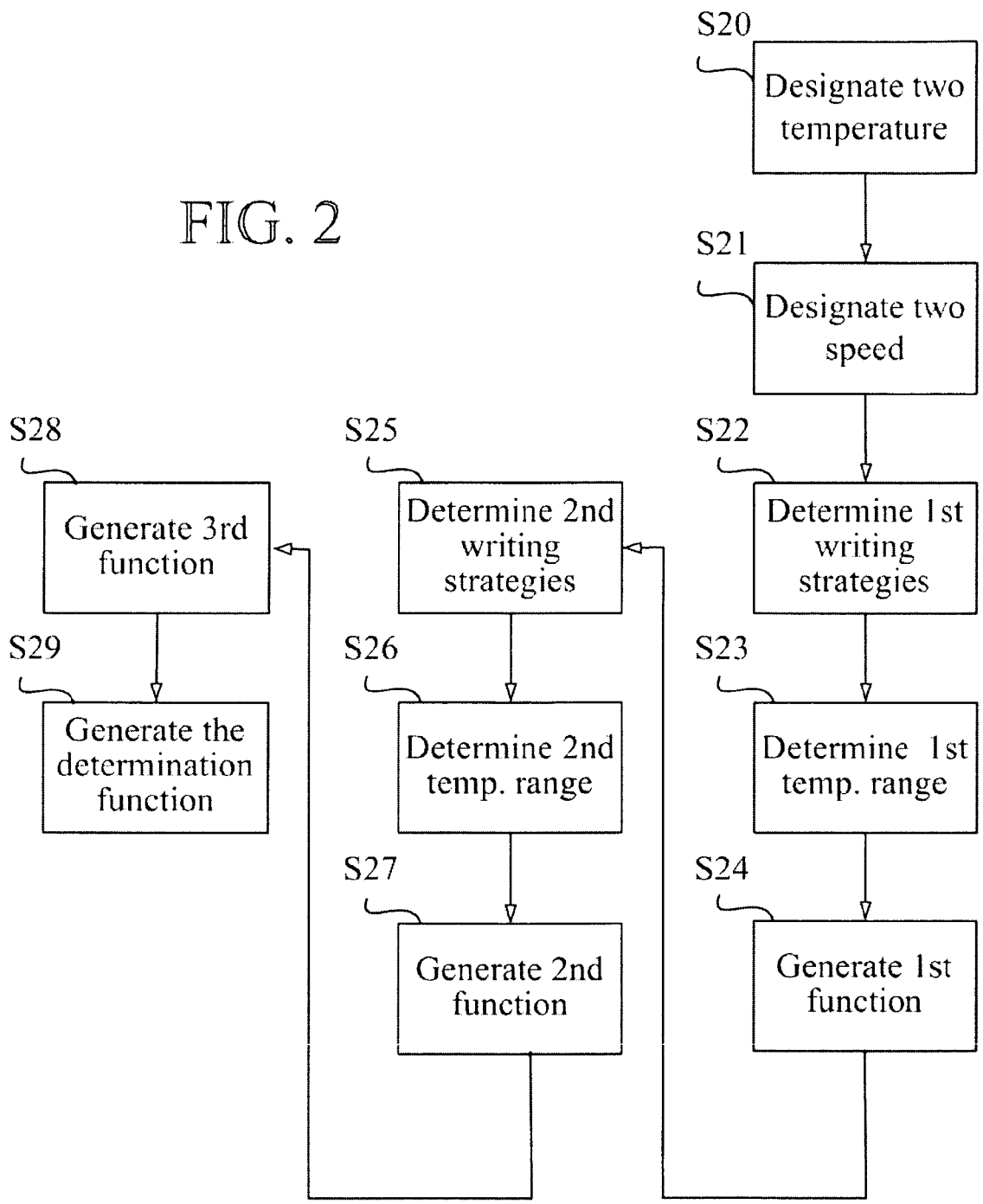
FIG. 2 is a flowchart illustrating the procedure to establish a determination function of speed and temperature, and the determination function relates to a plurality of allowable writing strategies.

Referring to FIG. 2, FIG. 2 is a flowchart illustrating the procedure to establish a determination function of speed and temperature, and the determination function relates to a plurality of allowable writing strategies.

As shown in FIG. 2, in the first preferred embodiment, the procedure to establish a determination function is as follows. First, step S20 is performed to designate a first temperature and a second temperature that is higher than the first temperature. The first temperature is a room temperature, and the second temperature is the highest acceptable temperature for the optical pickup unit of the CD drive. Afterwards, step S21 is performed. In step S21, at least two test speeds are designated.

Step S22 is then performed. In step S22, under the condition where operation is performed with at least two test speeds alternately in the first temperature, a respective first writing strategy corresponding to each test speed being operated is determined. After determining the corresponding first writing strategies, step S23 is performed. In step S23, a first temperature range, in which the first writing strategies determined in step S22 can suitably operate under a plurality of speeds possibly being designated, is determined. The first temperature range is between the first temperature and a third temperature, and the third temperature is higher than the first temperature but lower than the second temperature. In step S24, a first function of speed and temperature is generated according to the first temperature, the third temperature, and the first writing strategies determined in step S22. The first function relates to the plurality of allowable writing strategies which can suitably operate within the first temperature range.

Next, step S25 is performed under the second temperature. In step S25, under the condition where operation is performed with at least two test speeds alternately, a respective second writing strategy corresponding to each test speed being operated is determined. After determining the corresponding second writing strategies, step S26 is performed. In step S26, a second temperature range, in which the second writing strategies determined in step S25 can suitably operate under the of the plurality of speeds possibly being designated, is determined. The second temperature range is between the second temperature and a fourth temperature, and the fourth temperature is lower than the second temperature but higher than the third temperature.

In step S27, a second function of speed and temperature is generated according to the second temperature, the fourth temperature, and the second writing strategies determined in step S25. The second function relates to the plurality of allowable writing strategies which can suitably operate within the second temperature range.

In step S28, a third function of speed and temperature is generated according to the third temperature, the fourth temperature, the first writing strategies, and the second writing strategies. The third function relates to the plurality of allowable writing strategies which can suitably operate between the third temperature to the fourth temperature. Finally, step S29 is performed to combine the first function, the second function, and the third function into the determination function which is determined by speed and temperature.

Figure 3:
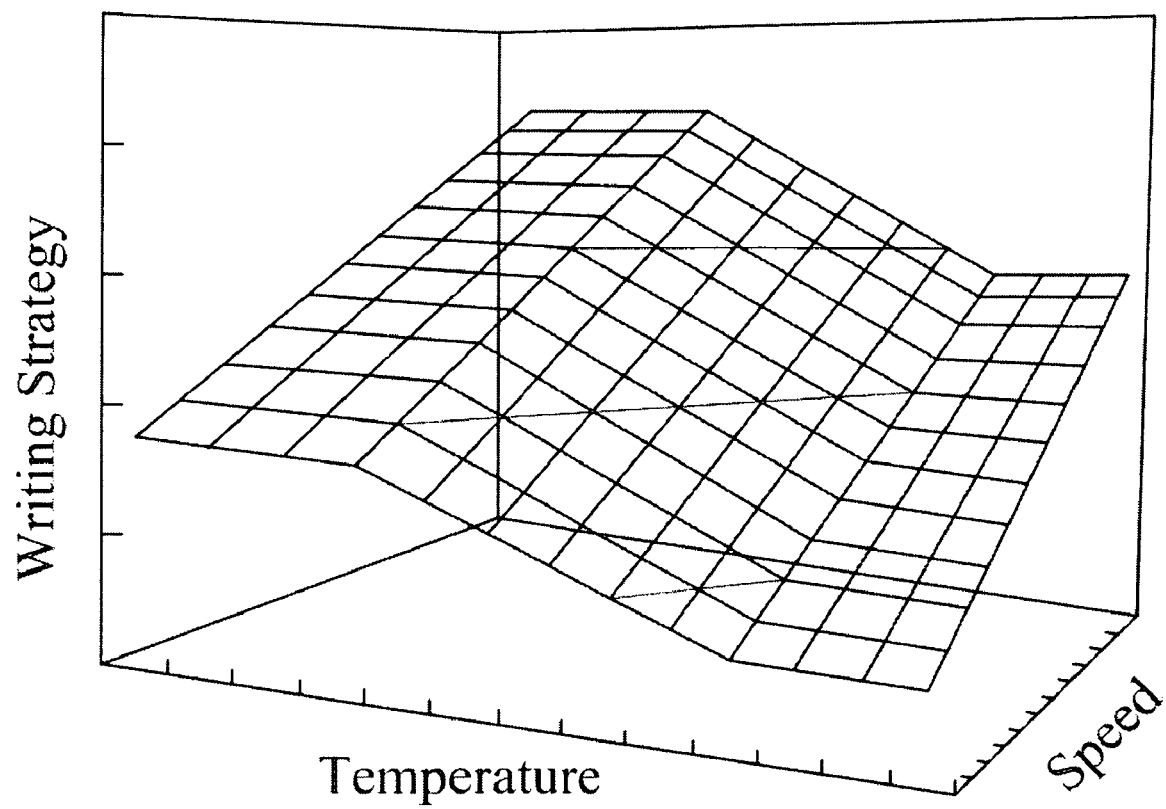
FIG. 3 is a determination function diagram established for an optical information recording system according to the procedure shown in FIG. 2.

Referring to FIG. 3, FIG. 3 is a determination function diagram established for an optical information recording system according to the procedure shown in FIG. 2, and the determination function of speed and temperature relates to the plurality of allowable writing strategies.

In an embodiment, the procedure to establish a determination function is, to first designate a plurality of temperature and a plurality of test speeds. Afterwards, in the plurality of temperatures, and respectively, under operations with the plurality of test speeds, a respective allowable writing strategy corresponding to the test speed and the temperature being operated is determined. Then, the determination function of speed and temperature is generated according to the determined allowable writing strategies.

In another embodiment, the procedure to establish a determination function is, to first designate a first temperature, a second temperature higher than the first temperature, and at least two test speeds. Thereafter, under the first temperature and operations with at least two test speeds alternately, a respective first writing strategy corresponding to the test speed being operated is determined. A first function of speed is generated according to the determined first writing strategies. The first function relates to the plurality of allowable writing strategies. In the same way, under the second temperature, and operations with at least two test speeds alternately, a respective second writing strategy corresponding to the test speed being operated is determined. A second function of speed is generated according to the determined second writing strategies, and the second function relates to the plurality of allowable writing strategies. Finally, the determination function of speed and temperature is generated according to the first function and the second function, and the determination function relates to the plurality of allowable writing strategies.

In another embodiment, the determination function is implemented into a look-up table. The look-up table is established according to the determination function, and one of the allowable writing strategies is determined, by applying the user-desired speed and temperature into the look-up table, as the optimum writing strategy.

According to the second embodiment of the invention, the method is used for determining an optimum writing strategy for an optical information recording system to record information onto an optical information recording medium operated at a particular speed.

The procedure of a method for determining an optimum writing strategy according to the second preferred embodiment of the invention includes the following steps. First, a determination function of temperature is provided, and the determination function relates to a plurality of allowable writing strategies. Afterwards, a temperature in the optical information recording system is sensed. Finally, one of the allowable writing strategies is determined, by applying the temperature into the determination function, as the optimum writing strategy.

In the second preferred embodiment, the procedure to establish a determination function of temperature is as follows. First, a first temperature and a second temperature higher than the first temperature are designated. The optical information recording medium is operated at a particular speed, and a first writing strategy corresponding to the first temperature is determined. Then, a first temperature range, in which the first writing strategy can suitably operate to record information on the optical information recording medium, is determined. The first temperature range is between the first temperature and a third temperature, and the third temperature is higher than the first temperature but lower than the second temperature. A first function of temperature is then generated according to the first temperature, the third temperature, and the first writing strategy, and the first function can suitably operate within the first temperature range.

Afterwards, the optical information recording medium is operated at the particular speed, and a second writing strategy corresponding to the second temperature is determined. A second temperature range, in which the second writing strategy can suitably operate to record information on the optical information recording medium, is then determined. The second temperature range is between the second temperature and a fourth temperature which is lower than the second temperature but higher than the third temperature. A second function of temperature is generated according to the second temperature, the fourth temperature, and the second writing strategy, and the second function can suitably operate within the second temperature range.

Finally, a third function of temperature is generated according to the third temperature, the fourth temperature, the first writing strategy, and the second writing strategy. The third function relates to the plurality of allowable writing strategies and can suitably operate between the third temperature and the fourth temperature. Moreover, the last procedure is to combine the first function, the second function, and the third function to establish the determination function which is determined by temperature.

In an embodiment, the procedure to establish a determination function is to first designate a plurality of temperatures. Afterwards, the optical information recording medium is operated at a particular speed, and with operations under the plurality of temperatures alternately, a respective allowable writing strategy corresponding to the temperature being operated is determined. Then, the determination function of temperature is generated according to the determined allowable writing strategies.

In another embodiment, the procedure to establish a determination function is, to first designate a first temperature and a second temperature higher than the first temperature. Thereafter, the optical information recording medium is operated at the particular speed, and a first writing strategy corresponding to the first temperature and a second writing strategy corresponding to the second temperature are determined. Finally, the determination function of temperature is generated according to the first writing strategy and the second writing strategy, and the determination function relates to the plurality of allowable writing strategies.

In an embodiment, the determination function is implemented into a look-up table, and one of the allowable writing strategies is determined, by applying the temperature into the look-up table, as the optimum writing strategy.

In an embodiment, each of the allowable writing strategies can be a corresponding ratio between an erasing power level and a writing power level or a corresponding length of a cooling gap after the separated specified pulse with respect to the recording of the information onto the optical information recording medium.

In another embodiment, the optical information recording medium is an ultra-speed CD-RW.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for selecting a writing strategy for an optical information recording system, the method comprising:
    establishing a determination function relating to a plurality of allowable writing strategies,
    wherein establishing the determination function comprises:
    designating a first temperature and a second temperature;
    designating at least two test speeds;
    determining a first plurality of writing strategies corresponding to the test speeds at the first temperature;
    generating a first function of speed from the first plurality of writing strategies, the first function of speed relating to the plurality of allowable writing strategies;
    determining a second plurality of writing strategies corresponding to the test speeds at the second temperature;
    generating a second function of speed from the second plurality of writing strategies, the second function of speed relating to the plurality of allowable writing strategies; and
    combining the first function of speed and the second function of speed to establish the determination function;
    receiving an indicated speed;
    sensing a temperature in the optical information recording system; and
    selecting one of the allowable writing strategies by applying the indicated speed and the sensed temperature in the determination function.

2. The method of claim 1 wherein the determination function is implemented into a look-up table, and selecting one of the allowable writing strategies comprises applying the indicated speed and the sensed temperature into the look-up table.

3. The method of claim 1 wherein the second temperature is higher than the first temperature.

4. The method of claim 1 wherein each of the allowable writing strategies comprises a ratio of an erasing power level and a writing power level when recording the information onto an optical information recording medium.

5. The method of claim 1 wherein each of the allowable writing strategies comprises a preselected length of a cooling gap after a separated specified pulse when recording the information onto an optical information recording medium.

6. The method of claim 1 wherein the optical information recording medium comprises an ultra-speed CD-RW.

7. A method for selecting a writing strategy for an optical recording system, the method comprising:
    designating a first temperature and a second temperature higher than the first temperature;
    designating a first test speed and a second test speed;
    determining a first writing strategy corresponding to the first test speed;
    determining a first temperature range in which the first writing strategy can be suitably operated at a plurality of speeds, the first temperature range being between the first temperature and a third temperature higher than the first temperature but lower than the second temperature;
    generating a first function of speed and temperature based on the first writing strategy;
    determining a second writing strategy corresponding to the second test speed;
    determining a second temperature range in which the second writing strategy can be suitably operated at a plurality of speeds, the second temperature range being between the second temperature and the third temperature;
    generating a second function of speed and temperature based on the second writing strategy;
    combining the first function of speed and temperature and the second function of speed and temperature into a determination function; and
    selecting a writing strategy by applying the determination function.

8. The method of claim 7 wherein the second temperature range is between the second temperature and a fourth temperature, the fourth temperature being lower than the second temperature but higher than the third temperature, the method further comprising:
    determining a third writing strategy corresponding to a third test speed;
    determining a third temperature range between the third temperature and the fourth temperature at which the third writing strategy can be suitably operated;

generating a third function of speed and temperature based on at least one of the first writing strategy, the second writing strategy, and the third writing strategy; and combining the first function of speed and temperature, the second function of speed and temperature, and the third function of speed and temperature into the determination function.

9. A method for determining an optimum writing strategy for an optical information recording system, the method comprising:

designating a determination function of temperature by:

selecting a first temperature based on a predetermined speed at which the optical information recording system is configured to operate, and determining a first writing strategy corresponding to the first temperature;

determining a first temperature range higher than the first temperature at which the first writing strategy is available, and generating a first temperature function for operation in the first temperature range and according to the first writing strategy;

selecting a second temperature higher than the first temperature based on the predetermined speed at which the optical information recording system is configured to operate, and determining a second writing strategy corresponding to the second temperature;

determining a second temperature range higher than the second temperature at which the second writing strategy is available, and generating a second temperature function for operation in the second temperature range and according to the second writing strategy; and combining the first temperature function and the second temperature function into the determination function;

sensing a temperature in the optical information recording system; and selecting one of the allowable writing strategies by applying the sensed temperature in the determination function.

10. The method of claim 9 wherein the determination function is implemented into a look-up table, and wherein one of the allowable writing strategies is selected by applying the sensed temperature in the look-up table.

11. The method of claim 9 wherein the first temperature range and the second temperature range together comprise a contiguous temperature range.

12. The method of claim 9, wherein the determination function is further determined by:

selecting a third temperature based on the predetermined speed at which the recording system is configured to operate at the particular speed, and determining a third writing strategy corresponding to the third temperature, the third temperature being lower than the second temperature and higher than the first temperature;

determining a third temperature range higher than the third temperature at which the third writing strategy is available, and generating a third temperature function for operation in the third temperature range and according to the third writing strategy; and combining the first temperature function, the second temperature function, and the third temperature function into the determination function.

13. The method of claim 9 wherein each of the allowable writing strategies comprises a ratio between an erasing power level and a writing power level when recording the information onto an optical information recording medium.

14. The method of claim 9 wherein each of the allowable writing strategies comprises a preselected length of a cooling gap after the separated specified pulse when recording the information onto an optical information recording medium.

15. The method of claim 9 wherein the optical information recording medium comprises an ultra-speed CD-RW.

16. The method of claim 9 wherein the predetermined speed is generally constant when recording the information onto an optical information recording medium.

17. The method of claim 9 wherein selecting the first temperature and the second temperature comprises selecting temperatures to reduce a risk of overheating according to the first writing strategy and the second writing strategy, respectively.

* * * * *